United States Patent

[11] 3,593,664

| [72] | Inventors | Willard F. Davis<br>Brigham City;<br>Roger A. Grosgebauer, Ogden; Gary V. Adams, Raymond De Grose, Brigham City, all of Utah |
|---|---|---|
| [21] | Appl. No. | 787,079 |
| [22] | Filed | Dec. 26, 1968 |
| [45] | Patented | July 20, 1971 |
| [73] | Assignee | Thiokol Chemical Corporation<br>Bristol, Pa. |

[54] AERIAL FLARE AND PARACHUTE DEPLOYMENT MEANS THEREFOR
7 Claims, 4 Drawing Figs.

[52] U.S. Cl. .................................................. 102/35.6
[51] Int. Cl. ............................................. F42b 13/38,
                                                    F42b 25/04
[50] Field of Search ...................................... 102/35.6,
                    35.2, 34.4, 37.6, 4, 35; 89/1, 1.5

[56]                References Cited
                UNITED STATES PATENTS

| 1,621,421 | 3/1927 | Kunzer .......................... | 102/35.6 |
| 1,709,644 | 3/1929 | Wiley, Jr. ...................... | 102/35.6 |
| 1,771,455 | 7/1930 | Wiley ............................. | 102/4 |
| 2,394,897 | 2/1946 | Cavanagh ...................... | 102/35.6 |

*Primary Examiner*—Samuel W. Engle
*Attorney*—William R. Wright, Jr.

ABSTRACT: An aerial illuminating flare is provided having a parachute deployed from the flare by a timer in cooperation with a detent mechanism and compression spring. When a predetermined time interval has elapsed after launch, the detent releases the timer mechanism from the flare case and it is ejected, pulling the parachute out with it. The flare becomes ignited by a trigger-igniter means operated by a lanyard from the trigger to a parachute riser and pulled thereby as the parachute is deployed.

INVENTORS
Willard F. Davis
Roger A. Grosgebauer
Gary V. Adams
Raymond De Groshe

BY *William R. Wright*
THEIR AGENT

INVENTORS
Willard F. Davis
Roger A. Grosgebauer
Gary V. Adams
Raymond DeGroshe

BY *William R. Wright Jr.*
THEIR AGENT

INVENTORS
Willard F. Davis
Roger A. Grosgebauer
Gary V. Adams
Raymond De Groshe

AERIAL FLARE AND PARACHUTE DEPLOYMENT MEANS THEREFOR

BACKGROUND OF THE INVENTION

The present invention relates to illuminating flares of the type which are carried aloft by an aerial vehicle, usually an airplane and launched therefrom. It relates more particularly to the deployment of a slow descent device, usually a parachute, after the flare has dropped from a predetermined time interval and to automatic ignition of the illuminant contained within the flare at parachute deployment.

Flares dropped from aircraft for illuminating the ground from the air have been in use for many years for this purpose. There are, however, problems which are inherent in such devices which, while they are perhaps not the only problems associated with aerial flares, are very important to its operation in an effective manner. These are:

1. How to achieve positive deployment of a slow descent device;
2. How to achieve such deployment at a precise time;
3. How to achieve ignition of the illuminant at the instant of deployment of the slow descent device;
4. How to achieve the foregoing in an aerial flare which will not become inoperative because of deterioration under long term storage conditions in unusual and extreme environments.

As just stated broadly above one of the principal problems associated with flares of this type is to assure that the slow descent means associated with the flare be made to operate positively at predetermined vertical distances from the aircraft ranging all the way from about 60feet to 10,500feet. Existing flares utilize a pyrotechnic device for this purpose with a fuse which burns for a certain time after which a parachute is deployed. Such an arrangement, however, has been found to be generally unreliable and therefore unsafe for airborne use. Also, with respect to problem 4above, such arrangements tend to be unacceptable for long term storage of up to five years because of deterioration brought about by the extreme environmental conditions to which devices of this sort are often exposed and which may result in an inoperative device. In the present invention, however, no pyrotechnic materials are used and mechanisms which are relatively unaffected by extreme environments are utilized instead to give reliable, positive and accurately controlled results.

The present invention provides an effective solution to all of these problems by providing a parachute attached to the flare by risers and forcibly ejected from its container upon the expiration of a predetermined time interval by a powerful but simple spring action which is released by a relatively simple and positive release mechanism. Ignition is accomplished by the provision of a mechanical lanyard attached to a riser and to trigger means on an illuminant igniter and which is pulled upon ejection and opening of the parachute to cause ignition if the illuminant. Effective seals are provided wherever needed to keep deteriorating atmospheres from entering the flare case during periods of storage.

It is, therefore, an object of the present invention to provide an aerial illuminating flare adapted to be launched or dropped from an aircraft and having a slow descent means, wherein deployment of the slow descent means and ignition of the illuminant are accomplished positively, automatically and substantially simultaneously and upon the expiration of a predetermined time interval and drop distance.

It is also an object of the present invention to provide a parachute flare of the foregoing type in which the parachute deployment mechanism can be preset for operation at a predetermined time or distance from the aircraft which drops it and which will operate in a reliable, positive and safe manner but which cannot operate prematurely before it is launched.

It is also an object of the present invention to provide aerial flare of the foregoing type in which its working parts are effectively sealed from deteriorating environments which might otherwise impair their proper operation.

Figure 1:
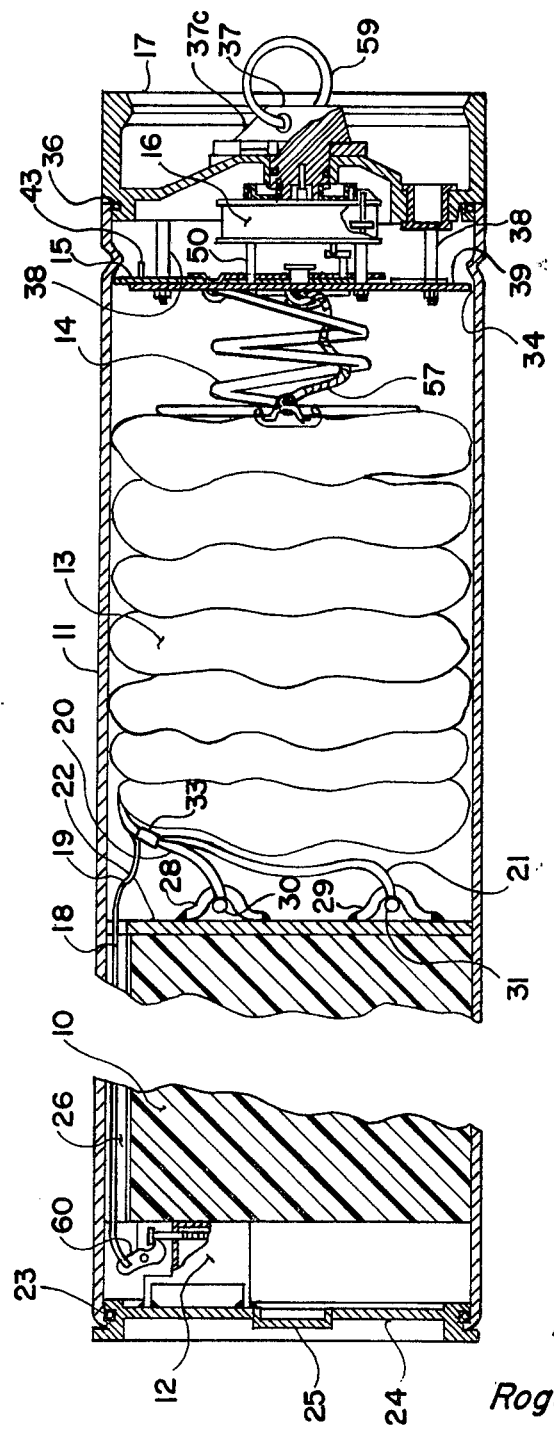
FIG. 1 is a longitudinal cross-sectional view of the flare showing it in the stored or predrop condition.

A preferred embodiment of the present invention is shown in FIG. 1 in which an illuminant 10 composed, for example, of approximately 52 percent magnesium and 48 percent sodium nitrate, is encased in a cylindrical aluminum case 11 and is retained therein by bonding to case 11 resulting from casting the illuminant directly in place and by wall 22 at its inner end. A trigger operated igniter 12 is located at the left end of the illuminant 10 and is in contact with it so that operation of the igniter will ignite the illuminant which, of course, continues to burn once it is ignited. Mounted at the outer end of case 11 adjacent to the igniter 12 and illuminant 10, is a cover 24 which includes an O-ring type seal 23 between it and case 11 and a plastic pressure release plug 25 bonded in place at its center. Along the side of illuminant 10, and coextensive with it and aligned with the trigger mechanism of igniter 12, is a channel or raceway 26 to accommodate lanyard 18, the function of which will be explained later in this specification.

At the right-hand end of illuminant 10 in FIG. 1 is wall or bulkhead 22, as previously mentioned, and on its face away from the illuminant 10 are two attachments points 28, 29 for each of two parachute risers 20, 21. These attachments are each formed as a socket surrounding a ball, the balls being designated as 30, 31, and each ball being attached to one of the two parachute risers 20, 21 in the manner shown. The risers 20, 21 extend from these attachments to the parachute, branching out into a number of shroud lines above the attachment point 33 of ignition lanyard 18.

With reference again to FIG. 1, it will be seen that folded parachute 13 is located in case 11 in the manner shown with compressed strong spring 14 located to its right in FIG. 1 and bearing both upon the parachute and upon base 39 of the detent mechanism, a timer 16 being retained in place by means of detent arms 15 which extend outward and intercept annular lip 34 formed in the wall of the case 11. Arms 15 are spring loaded so as to be urged away from and past the lip 34 when the timer 15 has run out its predetermined time interval, but are stopped from such action until the full time interval has expired. This is explained in full detail later in this specification.

At the far right in FIG. 1 is shown cover assembly 17 which fits slidably into the open end of case 11 and is sealed about its periphery by O-ring 36 to prevent the entry of moisture. Centrally located in cover 17 is a circular aperture 19 into which an extended, pluglike portion 37a of knob 37 is slidably fitted with an O-ring 35 between it and cover 17 to prevent the entry of moisture and to provide a reasonably tight fit. The inner end of pluglike portion 37a has a circular protuberance 37b about its periphery which acts as a stop to keep plug-knob 37 from falling out of the aperture 19. It is, however, made of a relatively soft plastic material such as polyethylene and is slotted at equidistant locations about its periphery so that when plug-knob 37 is pulled firmly to the right in FIG. 2, the protuberance 37bbecomes deformed sufficiently to permit withdrawal of the entire plug-knob 37, the plug-knob being removed for reasons to be described later in this specification.

Figure 2:
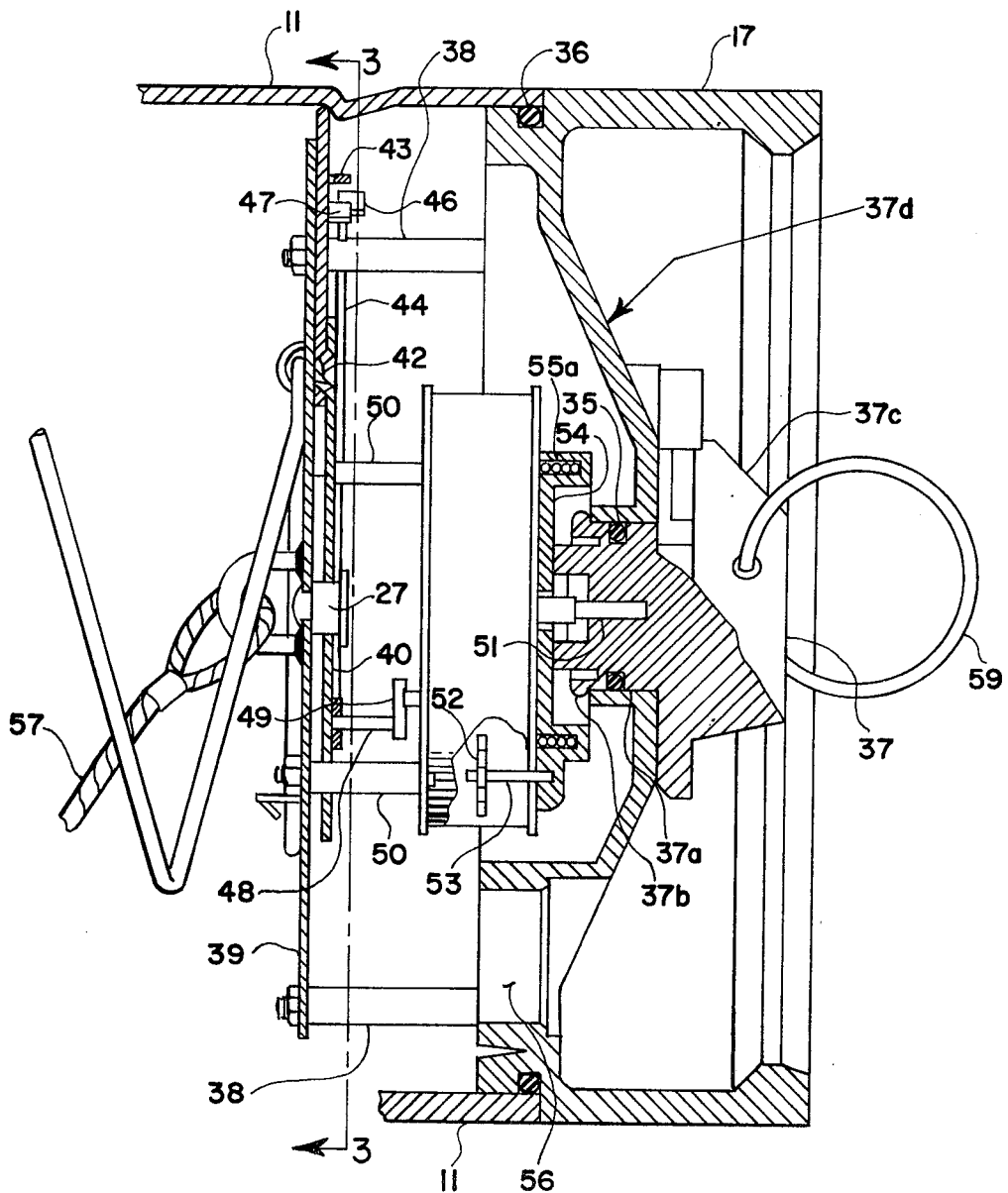
FIG. 2 is an enlarged partially cutaway side view of the cover and timer and its retention mechanism.
Figure 3:
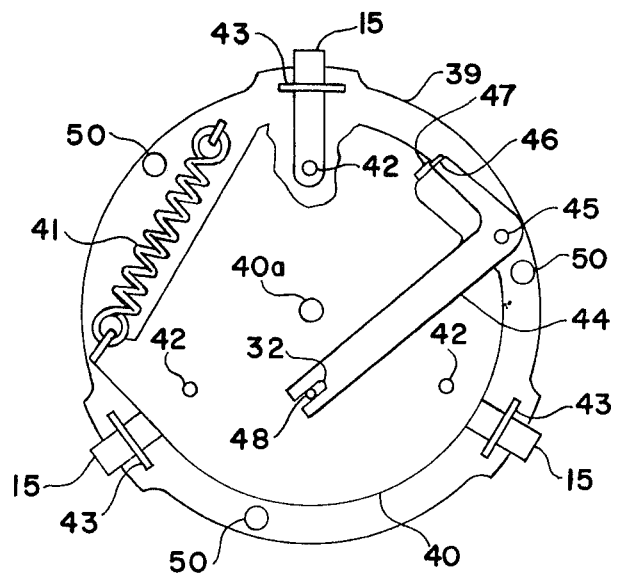
FIG. 3 is a cross-sectional view of the detent mechanism taken on lines 5–5 and looking in the direction of the arrows.

As will be seen in FIGS. 2 and 3 cover assembly 17 has three supports 38 extending from it into the interior of case 11 and attached to them and supported by them in base 39. Pivotally attached to it at its center by pin 27 is a plate 40 having arms 15 also pivotally attached to it by pivots 42, arms 15 loosely passing through fixed slotted guides 43 attached to base 39 and spaced 120° apart about its periphery as shown in FIG. 3. It will be seen that rotation of plate 40 with respect to base 39 will cause the ends of arms 15 to be drawn back toward guides 43 and it is this action that releases the mechanism from the case 11 since the arms 15 then no longer intercept lip 34. Plate 40 is spring-loaded by means of tension spring 41 attached to it and base 39 so that this action will take place automatically when the plate 40 is allowed to rotate. There is provided, however, a stop mechanism comprising right angle arm 44 which is itself pivotally attached to plate 40 by pivot pin 45 and which has a tab 46 which intercepts tab face 47 of plate 40 and prevents its rotation. The leg of the right angle arm 44 which is opposite to that carrying the tab 46, has a slot 32 into which extends pin 48 from cam 49 of timer 16 to prevent movement of arm 44 and thus to preclude movement of plate 39 until such time as pin 48 is moved in slot 32 by the action of cam 49 driven by timer 16. The operation of timer 16 and its cam 49 are explained later in this specification.

Again with reference to FIG. 2, it will be seen that timer 16 is fixedly mounted to base 39 by a plurality of support posts 50 with its central winding shaft 51 extending to its right in the drawing as shown and into plug-knob 37. The outer end of shaft 51 has flats on its sides to correspond with the flat sided receiving slot in plug-knob 37 into which it fits snugly with the result that any rotation of plug-knob 37 will also cause rotation of winding shaft 51 which in turn winds the timer 16. This timer 16 is a clockwork mechanism of standard manufacture having an escapement mechanism. Spoked escapement wheel 52 is inside of timer 16 and spokes of wheel 52 are intercepted by pin 53 and cannot rotate as long as this pin is in place, pin 53 extending through an aperture in the face of timer 16 and being fixedly attached to arming plate 54 which in turn is held against timer 16 by plug-knob 37. A helical spring 55 is included in an annular channel 55a arming plate 54 and is held in a compressed condition by plug-knob 37 which is in turn held in place in cover 16 by rim 37b.

Figure 4:
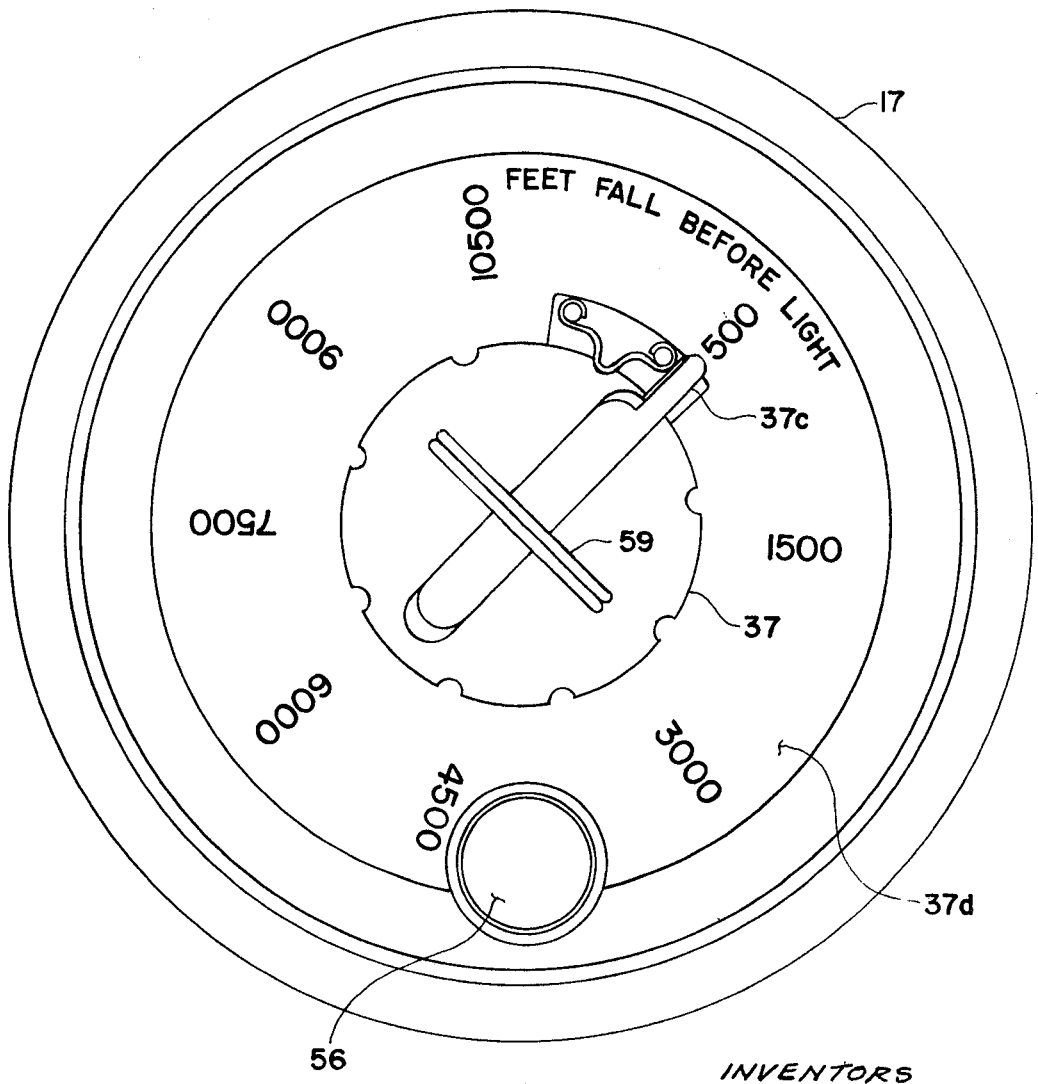
FIG. 4 is an external end view of the timer end of the flare showing the pointer and the interval setting scale.

Returning to the exterior of cover 17 and with reference to FIGS. 2 and 4, plug-knob 37 includes a pointer portion 37c and this is arranged to sweep over a scale 37d marked in feet of descent or in seconds and calibrated to indicate the exact reading corresponding to the time interval measured by the clockwork of the timer 16. A pull ring 59 is provided for plug-knob 37.

The entire cover assembly 17 including the detent mechanism and timer 16 is inserted into the right-hand end of the case 11 until it abuts the end of case 11 as shown. A simple forked two pronged tool or other suitable tool is then inserted through aperture 56 in cover 17 to pull against spring 41 to retract the arms 15 so that they can pass to the left-hand side of the annular lip 34 in case 11 after which the tool is removed and arms 15 spring out to intercept the lip 34, thus retaining the whole cover assembly 17 in place in case 11.

Attached to the left-hand side of base 39 is strong compression spring 14 which is spiral in form with its small diameter end at base 39. The opposite, or large diameter end of spring 14, rests upon folded parachute 13. As cover assembly 17 is put into place and is locked in, spring 14 becomes fully compressed urging itself against the tightly folded parachute 13 on one end and base 39 at its other end. A parachute lanyard 57 is attached to base 39 and to the top of parachute 13 as shown.

A plug sealed by O-ring 58 is provided for aperture 56 and is put in place after the detent mechanism has been set with the setting tool and the tool has been removed.

OPERATION

In operation, with the entire flare assembled as shown in FIG. 1 and just prior to launch, plug-knob 37 (see FIG. 4) is rotated manually in a clockwise direction until pointer 37c points to the exact desired time interval or feet of fall shown on scale 37d. This rotative action winds the clockwork of timer 16 to just the right amount for that particular scale reading but the escapement mechanism cannot start to operate until pin 53 is removed. Plug-knob 37 is then manually pulled entirely out of cover 17 thus freeing arming plate 54 which then moves to the right in the drawings under the urging of spring 55 and causes pin 53 to withdraw from contact with escapement wheel 52, thus allowing timer 16 to start to run. The whole flare assembly, with the exception of plug-knob 37 is then immediately launched or dropped from the aircraft.

During the initial descent of the flare, timer 16 continues to operate until the predetermined time interval has elapsed at which time cam 49 completes its rotation and causes pin 48 to describe an upward circular arc while sliding in slot 32 (see FIG. 3) thus moving arm 44 upward and thus freeing it from interference with tab face 47 and allowing spring-loaded plate 40 to rotate sufficiently to cause detent arms 15 retract from their original position intercepting lip 34. Upon the retraction of arms 15, the whole cover, timer and detent mechanism is freed from case 11 and under strong urging of compressed spring 14 is forcibly ejected from it, pulling lanyard 57 and its attached parachute 13 out with it into the air. Once out in the air, parachute 13 is opened rapidly and automatically by the airflow created by the free fall and the flare then hangs in a vertical manner with the illuminant 10 downward and with the whole flare supported from the parachute by risers 20, 21. While this is occurring, however, ignition lanyard 26 is firmly pulled by the straightening of riser 20 to which it is attached and this pull on lanyard 26 actuates trigger 60 and causes the igniter 12 to function. This action ignites the illuminant 10 which then continues to burn as the flare slowly descends supported by its parachute 13, the aluminum case 11 generally being consumed along with the illuminant 10 as the high temperature combustion continues until the illuminant is completely consumed.

It is to be understood that the form of the invention herewith shown and described is to be taken as a preferred example of the same and that various changes in the shape, size and arrangement of parts may be resorted to without departure from the spirit of the invention.

What we claim is:

1. An aerial illuminating flare comprising, in combination, an illuminant contained in a housing, slow descent means attached to said housing and initially contained in a chamber therein, deployment means for the slow descent means including a chamber cover assembly including escapement timing means and detent means releasably retaining the cover assembly in the housing and a compressed spring between the slow descent means and the cover assembly, attachment means between the cover assembly and the slow descent means, said timing means releasing said releasable retaining means to permit operation of said deployment means after a predetermined time interval, an igniter for said illuminant, trigger means for causing operation of said igniter, and means connecting the trigger means to the slow descent means, whereby ejection of the cover assembly under urging of the spring pulls the slow descent means out of its chamber in the housing, the igniter is operated and the illuminant becomes ignited.

2. The invention set forth in claim 1 with the slow descent means comprising a parachute having risers and the means connecting the trigger means to it comprising a lanyard attached to the trigger means at one end of the lanyard and to a riser of the parachute at the other end of the lanyard, whereby the lanyard and the trigger means are pulled as the parachute is deployed.

3. The invention set forth in claim 1 with the slow descent means being a parachute and the cover assembly attached to the top of the parachute by a lanyard.

4. The invention set forth in claim 1 with the detent means comprising at least one arm initially extended to intercept a lip in the housing and means responsive to the timing means to retract said arm free of said lip upon the expiration of a predetermined time interval.

5. The invention set forth in claim 4 with the last-named means comprising a spring urging said arm free of said lip, detent means therefor initially holding said arm in interception with the lip and cam means operated by the timing means to release said detent means and thus allow the arm to retract free of the lip.

6. The invention set forth in claim 1 with timing means having a spoked escapement wheel, an arming pin extended through said escapement wheel so as to intercept a spoke thereof to prevent rotation of the wheel and thus to prevent operation of the timing means, said arming pin spring loaded in a direction of withdrawal from the escapement wheel, and a removable plug blocking withdrawal of the arming pin with the plug in place and freeing it when the plug is removed, whereby upon removal of the plug the pin withdraws and operation of the timing means is permitted.

7. The invention set forth in claim 6 with the plug including a knob rotatable as well as removable and removable in all positions of rotation, shaft means slidably connecting the plug with the timing means in a positive rotary drive manner, pointer means associated with said knob, and an indicator scale adapted to be swept over by said knob.